United States Patent [19]

Morimoto et al.

[11] 3,991,030

[45] Nov. 9, 1976

[54] PROCESS FOR REDUCING VISCOSITY OF REACTION SOLUTION CONTAINING GRAFT COPOLYMER

[75] Inventors: Masayoshi Morimoto; Yasuhiko Higashio; Mikio Hirai, all of Ichihara, Japan

[73] Assignee: Sumitomo Chemical Co. Inc., Japan

[22] Filed: Apr. 3, 1975

[21] Appl. No.: 564,972

[30] Foreign Application Priority Data

Apr. 16, 1974 Japan.............................. 49-43187

[52] U.S. Cl. .................... 260/29.6 PM; 260/878 R
[51] Int. Cl.² ................ C08L 19/00; C08F 255/04; C08F 255/06
[58] Field of Search ................ 260/878 R, 29.6 PM

[56] References Cited

UNITED STATES PATENTS 3,538,192    11/1970    Bishop, Sr. ..................... 260/878 R
3,644,263    2/1972     Burke, Jr. .................... 260/29.6 PM

*Primary Examiner*—Alan Holler
*Attorney, Agent, or Firm*—James J. Long

[57] ABSTRACT

The viscosity of a solution of graft copolymer resulting from solution graft copolymerization is greatly reduced, and the handling characteristics are improved, by adding water and a suspending agent to the solution to form a suspension. E.g., to a reaction solution resulting from grafting of styrene and acrylonitrile on EPDM in solution, there is added 20 parts water and 0.1 part polyvinyl alcohol, and the mixture is agitated to produce a low-viscosity suspension.

7 Claims, No Drawings

PROCESS FOR REDUCING VISCOSITY OF REACTION SOLUTION CONTAINING GRAFT COPOLYMER

This invention relates to a process for treating a reaction solution resulting from graft copolymerization of an aromatic vinyl compound, or an aromatic vinyl compound and a vinyl cyanide compound, on an amorphous elastic rubbery material. In more detail the present invention pertains to a process for reducing the viscosity of the reaction mixture by adding water and a suspending agent to a solution of graft copolymer resulting from a solution graft copolymerization process.

Ordinarily, these graft copolymers have been mostly produced, on an industrial basis, by an emulsion polymerization, bulk polymerization or suspension polymerization process, for example, as in the case of the production of an ABS resin. In addition, by taking note of the excellent weather-resistant property of an ethylene propylene rubber, the development of a production process of a graft copolymer, which has excellent impact-resistant and weather-resistant properties, through the graft copolymerization of an ethylene propylene rubber and styrene or styrene and acrylonitrile, and, as a production process, a bulk polymerization process (U.S. Pat. No. 3,538,192) and an emulsion polymerization (U.S. Pat. No. 3,435,096) have been known in the art. However, although a graft copolymer obtained by these processes may be equal to or superior, in the weather-resistant property, to the ABS resin, it may not be equal, in its impact-resistant property, to the ABS resin, or, even if it is equal to the ABS resin in this respect, the impact-resistant property greatly varies depending on working conditions. Therefore, as a production process by which an impact-resistant property equal to that of the ABS resin may be achieved, a solution polymerization (U.S. Pat. Nos. 3,538,190 and 3,538,191) has been proposed. If, however, such a graft copolymer is produced by such a solution polymerization process, the viscosity of the reaction solution containing the graft copolymer becomes extremely high if the concentration of the graft copolymer is high. As a result, it becomes extremely difficult to remove the heat generated during the polymerization or to stir the reaction solution, and it is very labor-consuming to transport the reaction solution. In some cases, various troubles, such as clogging of pipes, may take place, due to the adhesion to the polymerization tank or to the piping.

Therefore, for the purpose of reducing the viscosity of such a reaction solution, various measures, such as the reduction of the concentration of graft copolymer during the polymerization by increasing the solvent, and the reduction of the concentration of graft copolymer by adding a solvent after the completion of the polymerization, have been taken. However the former method is attended by the drawback that the resultant graft copolymer may not have satisfactory physical properties, and both the former and latter methods are attended by the defect that a large amount of a solvent must be used in order to reduce considerably the viscosity of the reaction solution; and that the solvent added must be separated again from the graft copolymer.

Therefore, the present inventors carried out extensive research on the problem of reducing the viscosity of such a viscous reaction solution, and, as a result they have found that the viscosity of such a reaction solution may be markedly reduced by adding water and a suspension agent to the reaction solution containing the graft copolymer.

That is, the present invention relates to a process to reduce the viscosity of a reaction solution containing a 2-dimensional or 3-dimensional graft copolymer obtained by the graft polymerization of an amorphous elastic rubber substance and an aromatic vinyl compound or an aromatic vinyl compound and a vinyl cyanide compound in the presence of a solvent, by adding water and a suspension agent consisting of a polyvinyl alcohol and/or a cellulose derivative to the reaction solution and thereby suspending the reaction solution.

Accordingly, in one aspect the present invention is concerned with a process for treating a reaction solution resulting from graft copolymerization in an organic solvent medium of an aromatic vinyl compound, or an aromatic vinyl compound and a vinyl cyanide compound, on an amorphous elastomeric substrate, comprising adding water to the organic solvent solution of graft copolymer and a suspending agent in an amount effective to produce a suspension of the solution and the water, and agitating the resulting mixture to produce a suspension, whereby there is produced a suspension having markedly reduced viscosity and improved handling characteristic compared to the original solution.

By comparison with the ordinary processes of adding a large amount of a solvent to such a reaction solution to reduce the viscosity thereof, the process in accordance with the present invention allows the viscosity of the reaction solution to be greatly reduced with an extremely small amount of water, and, therefore, by comparision with the former processes, handling of the reaction solution, such as stirring and transport of the reaction solution containing a graft copolymer of high concentration, becomes easy and, furthermore, the equipment for the post-treatment to separate and collect the graft copolymer may be designed to be small in size, thereby making the post-treatment process simple. Thus, the process in accordance with the present invention is industrially invaluable.

As to the amorphous elastic rubber substance to be used in the process in accordance with the present invention, use may be made of styrene-butadiene rubber, butadiene rubber, ethylene-propylene rubber, isoprene rubber, nitrile butadiene rubber, acrylic rubber, butyl rubber, etc. In this case, ethylene-propylene rubber includes not only the two-component system consisting of ethylene and propylene, but also the ethylene-propylene polymer (hereinafter referred to as EPDM) containing a non-conjugated diene such as dicyclopentadiene, 5-ethylidene-2-norborene, 1,4-hexadiene, etc. as a third component. In the process in accordance with the present invention, it is possible to use two or more kinds of rubbers. For example, use may be made of mixtures such as styrene-butadiene rubber with butadiene rubber, styrene-butadiene rubber with EPDM, butadiene rubber with EPDM, butadiene rubber with acrylic rubber, and styrene-butadiene rubber with acrylic rubber.

As to the aromatic vinyl compounds, mention may be made of styrene, α-methyl styrene, α-chlorostyrene, etc.; the use of styrene is preferred.

For the vinyl cyanide compounds, use is made of acrylonitrile and methacrylonitrile, for example.

For the polymerization solvents at the time of the solution polymerization, one may use those that are ordinarily being used. For example, use may be made of pentane, hexane, heptane, benzene, toluene, xylene, ethylbenzene, chlorobenzene, acetone, methyl ethyl ketone, acetic acid ethyl ester and dichloroethane. They may be used alone or in a combination of two or more kinds.

In the process in accordance with the present invention, it is necessary to add water and a suspension agent to a reaction solution containing the graft copolymer, and it is desirable to use 10 to 100 weight-parts of water with respect to 100 weight-parts of the reaction solution and, generally, 0.01 to 1.00 weight-part of a suspension agent with respect to 100 weight-parts of the reaction solution, although this depends on the kinds of solvent used and the amount of water added. It is most desirable to dissolve first the polyvinyl alcohol and/or cellulose derivative in water to be added and then to add the solution to the reaction solution. As to the effect of the addition of water containing a suspension agent, while the dispersion is of the W/O type when the amount of the addition is less than 10 weight-parts with respect to 100 weight-parts of a reaction solution, a phase transition to an O/W type dispersion state takes place, thereby suddenly reducing the viscosity when the amount of addition exceeds 10 weight-parts.

When the amount of addition exceeds 100 weight-parts, the reduction of the viscosity of the reaction solution is small with respect to the amount of water, and, consequently, the advantages in handling, such as stirring and transport and in the post-treatment process of a reaction solution containing a graft copolymer will be lost.

For the suspension agents in the process in accordance with the present invention, use is made either of a polyvinyl alcohol or a cellulose derivative or a combination thereof.

As to the polyvinyl alcohols, they should be chosen appropriately depending on their methods of application; a generally preferred type has a saponification degree of 50 mole % or higher, preferably 78.5 to 100 mole %, and a polymerization degree of 300 or higher, preferably 1,000 to 2,700. For the cellulose derivatives, use is made for example of carboxyl lower alkyl cellulose, hydroxy lower alkyl cellulose, or lower alkyl cellulose, such as of carboxyl methyl cellulose, hydroxy ethyl cellulose, methyl cellulose and ethyl cellulose. The polyvinyl alcohol and the cellulose derivative may be used, respectively, alone or in combination. In order to produce a stable suspension state, it is necessary to subject the mixture to shearing; however the stirring force used for a reaction or mixing is generally sufficient.

The viscosity of the resultant suspension solution is markedly low by comparison with that of the original viscous reaction solution, and the suspension solution is very stable. Therefore, handling, such as transport, is thereafter extremely easy.

We shall give below an example embodying the present invention; it should however be understood that the scope of the present invention is in no way restricted thereto.

EXAMPLE 500 g each of a polymerization solution obtained by the copolymerization of 280 g of EPDM (ethylenepropylene-5-ethylidene-2-norbornene terpolymer, iodine number 24, Mooney viscosity 40-ML-212° F., ethylene: propylene weight ratio 58:42), 350 g of acrylonitrile and 1,050 g of styrene in 2,800 g of n-hexane and 1,680 g of ethylene chloride, were taken in a separable flask of a capacity of 2 liters, and, while stirring by stirring blades of a turbine type, an aqueous solution of a suspension agent was added thereto at the rates shown in Table 1, thereby suspending the polymerization solution. After preparing a uniform suspension solution, the viscosity of the suspension solution was measured by a B-type viscosimeter made by Tokyo Keiki.

Table 1

| Example | Polymerization Solution | Viscosity of Suspension Solution | | Zero Shear Viscosity 25° C (cps) |
|---|---|---|---|---|
| | | Suspension Agent | Water | |
| 1 | 100 parts | Polyvinyl alcohol 0.07 part | 10 parts | 70,000 |
| 2 | 100 parts | Polyvinyl alcohol 0.10 part | 20 parts | 25,000 |
| 3 | 100 parts | Polyvinyl alcohol 0.07 | 27 parts | 27,000 |
| 4 | 100 parts | Methyl cellulose 0.1 part | 20 parts | 22,000 |
| 5 | 100 parts | Methyl cellulose 0.05 part + Polyvinyl alcohol 0.05 part | 20 parts | 18,000 |
| | 100 parts | | | 300,000 |

All the polyvinyl alcohols used in the abovementioned Table had a saponification degree of 87.0 to 89.0% and a polymerization degree in excess of 1,500. In all cases, the viscosity of the suspension solution was reduced to about one-tenth that of the respective original polymerization solution, and manipulating operations became very easy.

EXAMPLE FOR REFERENCE 500 g of the polymerization solution used in the Example was taken in a 2-liter separable flask, and, while stirring by stirring blades of a turbine type, n-hexane was added at the rate shown in Table 2 and the polymerization solution was diluted. After making it uniform, the viscosity of the polymerization solution was measured by a B-type viscosimeter made by Tokyo Keiki.

Table 2

| Reference Example | Viscosity of Polymerization Solutions Diluted | | |
|---|---|---|---|
| | Polymerization Solution | n-hexane | Zero Shear Viscosity 25° C(cps) |
| 1 | 100 parts | 10 parts | 220,000 |
| 2 | 100 parts | 20 parts | 66,000 |

Table 2-continued

| Reference Example | Viscosity of Polymerization Solutions Diluted | | |
|---|---|---|---|
| | Polymerization Solution | n-hexane | Zero Shear Viscosity 25° C(cps) |
| 3 | 100 parts | 40 parts | 11,000 |

The invention as described thus affords a number of important advantages. The tendency for the graft copolymer product to plate out or coat surfaces of the reaction vessel is greatly reduced. Normally graft copolymer adhered to the surface of the graft copolymerization vessel, or the surfaces of pipes through which the reaction solution is conducted, not only represents a waste of product but can seriously interfere with heat transfer in the course of subsequent graft copolymerizations carried out in the equipment. Sometimes the color of the graft copolymer product can be impaired by pieces of adhered product subsequently breaking off from the equipment surfaces. The invention greatly alleviates these difficulties by decreasing the tendency for the graft copolymer to build up on the equipment surfaces.

We claim:

1. A process for treating a reaction solution resulting from graft copolymerization in an organic solvent medium of an aromatic vinyl compound, or an aromatic vinyl compound and a vinyl cyanide compound, on an amorphous elastomeric substrate, comprising adding water to the organic solvent solution of graft copolymer and a suspending agent in an amount effective to produce a suspension of the solution and the water, and agitating the resulting mixture to produce a suspension, whereby there is produced a suspension having markedly reduced viscosity and improved handling characteristics compared to the original solution.

2. A process as in claim 1 in which the said elastomeric substrate is an ethylene-propylene or ethylene-propylene-non-conjugated diene copolymer rubber.

3. A process as in claim 1 in which the said aromatic vinyl compound is styrene.

4. A process as in claim 1 in which the said vinyl cyanide compound is acrylonitrile.

5. A process as in claim 1 in which the amount of water is from 10 to 100 parts by weight per 100 parts by weight of reaction solution.

6. A process as in claim 1 in which the suspending agent is polyvinyl alcohol, a cellulose derivative, or both, the said cellulose derivative being selected from the group consisting of carboxyl lower alkyl cellulose, hydroxy lower alkyl cellulose, and lower alkyl cellulose.

7. A process for treating a reaction solution resulting from graft copolymerization in organic solvent solution of styrene and acrylonitrile on an amorphous ethylene-propylene-non-conjugated diene terpolymer rubber substrate, comprising adding to the organic solvent solution from 10 to 100 parts by weight of water per 100 parts by weight of reaction mixture and a suspending agent which is polyvinyl alcohol or methyl cellulose in an amount effective to produce a suspension of the solution and the water, and agitating the resulting mixture to produce a suspension, whereby there is produced a suspension having markedly reduced viscosity and improved handling characteristics compared to the original solution.

* * * * *